United States Patent [19]

Valko et al.

[11] Patent Number: 4,931,157

[45] Date of Patent: Jun. 5, 1990

[54] EPOXY RESIN ADVANCEMENT USING URETHANE POLYOLS AND METHOD FOR USE THEREOF

[75] Inventors: Joseph T. Valko, Pittsburgh; Joseph E. Plasynski, Arnold; Robert D. Miller, Sewickley, all of Pa.

[73] Assignee: PPG Industries, Inc., Pittsburgh, Pa.

[21] Appl. No.: 157,013

[22] Filed: Feb. 18, 1988

[51] Int. Cl.$^5$ .................. C25D 13/06; C08L 63/00; C08L 63/02

[52] U.S. Cl. .................. 204/181.7; 523/414; 523/415; 523/416; 523/417; 523/404; 523/424; 525/526; 525/532; 524/901

[58] Field of Search .................. 204/181.7; 523/414–417, 404, 424; 525/526, 532

[56] References Cited

U.S. PATENT DOCUMENTS

| | | | |
|---|---|---|---|
| 2,802,022 | 8/1957 | Groszos et al. | 260/471 |
| 4,104,147 | 8/1978 | Marchetti et al. | 204/181 C |
| 4,122,069 | 10/1978 | Meyer | 528/93 |
| 4,147,679 | 4/1979 | Scriven | 204/181.7 |
| 4,260,720 | 4/1981 | Bosso et al. | 528/109 |
| 4,285,789 | 8/1981 | Kobayashi | 204/181.7 |
| 4,435,559 | 3/1984 | Valko | 528/73 |
| 4,468,307 | 8/1984 | Wismer et al. | 204/181 C |
| 4,484,994 | 11/1984 | Jacobs, III et al. | 204/181 C |
| 4,520,167 | 5/1985 | Blank et al. | 525/131 |
| 4,528,363 | 7/1985 | Tominaga | 528/370 |
| 4,542,173 | 9/1985 | Schupp | 204/181.7 |
| 4,543,376 | 9/1985 | Schupp | 204/181.7 |
| 4,677,168 | 6/1987 | Hoy et al. | 525/441 |
| 4,724,254 | 2/1988 | Geist et al. | 525/523 |

FOREIGN PATENT DOCUMENTS

| | | | |
|---|---|---|---|
| 12463 | 6/1980 | European Pat. Off. | |
| 3300570 | 7/1984 | Fed. Rep. of Germany | |
| 1531046 | 11/1978 | United Kingdom | 204/181.7 |
| WO87/00851 | 2/1987 | World Int. Prop. O. | |

*Primary Examiner*—John F. Niebling
*Assistant Examiner*—Ben C. Hsing
*Attorney, Agent, or Firm*—Daniel J. Long; William J. Uhl

[57] ABSTRACT

An ungelled reaction product of a polyepoxide and an active hydrogen-containing material containing at least two active hydrogens per molecule is disclosed. The active hydrogen-containing material being a hydroxyalkyl-substituted urethane in which the hydroxy group is in the beta position to the urethane group. The reaction product is useful as a precursor in making cationic resins for use in cationic electrodeposition.

18 Claims, No Drawings

EPOXY RESIN ADVANCEMENT USING URETHANE POLYOLS AND METHOD FOR USE THEREOF

BACKGROUND OF THE INVENTION

1. Field of the Invention:

Epoxy resin advancement involves the reaction of a polyepoxide such as a polyglycidyl ether of an aromatic diol, for example, bisphenol A, with a polyfunctional material which is reactive with the epoxide groups. Examples of such polyfunctional material are those which contain at least two active hydrogens per molecule such as

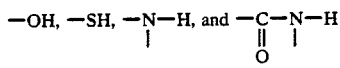

Specific examples of such materials are aromatic diols, polymeric glycols such as polyether diols and polyester polyols and polymercapto compounds.

The epoxy resin advancement is not a curing or crosslinking reaction but rather a chain extension reaction resulting in a higher molecular weight, ungelled reaction product which provides for better properties than the lower molecular weight precursor.

2. Brief Description of the Prior Art:

U.S. Pat. Nos. 4,468,307 and 4,104,147 disclose epoxy resin advancement with certain polyether and polyester polyols, respectively. The resultant advanced epoxy resins can be further reacted with cationic salt group formers to prepare cationic resins which are useful in the electrodeposition process. Chain extension of the polyepoxides with these polymeric polyols improves many physical properties associated with the resultant cationic electrodeposition coating.

One problem associated with polymeric polyol chain extension, however, is competing reactions. Under chain extension reaction conditions which are usually in the presence of amine catalyst, epoxy-epoxy reaction and epoxy-secondary hydroxyl reactions compete with the desired polymeric hydroxyl-epoxy reaction. This can result in considerable chain branching of the polymeric backbone leading to undesirably high molecular weight products which can adversely affect the smoothness of the resultant electrodeposited coating. Also, these competing reactions result in unreacted polymeric polyol chain extender which can be deleterious to the resultant coating composition.

These problems can be significantly minimized by chain extending with a polymeric mercapto compound such as disclosed in U.S. Patent 4,260,720. Under chain extension reaction conditions, the mercapto epoxy reaction proceeds relatively rapidly compared to the competing side reactions resulting in a resin which has better properties and does not have much unreacted chain extender. Unfortunately, the mercapto compounds have undesirable odor problems associated with them making them very difficult to work with.

In accordance with the present invention, it has been found that hydroxyalkyl-substituted urethanes containing at least two active hydrogens per molecule, preferably poly(hydroxyalkyl)-substituted urethanes in which the hydroxy groups are in the beta position to the urethane group make excellent chain extenders for polyepoxides, particularly polyglycidyl ethers of polyphenols. These materials result in an epoxy resin advancement with minimal competing reactions. It is believed the reaction product is essentially linear and there is essentially no unreacted chain extender in the reaction product. The resulting reaction products, when further modified to include cationic salt groups, can be used as resinous film formers in the process of cationic electrodeposition where they result in the formation of exceedingly smooth electrodeposited coatings.

SUMMARY OF THE INVENTION

In accordance with the present invention, an ungelled reaction product of a polyepoxide and an active hydrogen-containing material containing at least two active hydrogens per molecule is disclosed. The active hydrogen-containing material is selected from the class consisting of a hydroxyalkyl-substituted urethane in which the hydroxy group is in the beta position to the urethane group and an ethoxylated derivative of said hydroxy-substituted urethane including mixtures thereof.

The resultant reaction products can be used as precursors for the formation of cationic resins in which the reaction products are reacted with cationic salt group formers. The resultant cationic resins can then be used as film formers in the process of cationic electrodeposition where they result in the formation of extremely smooth electrodeposited coatings.

DETAILED DESCRIPTION

The polyepoxides which are used in the practice of the invention are epoxy-containing materials having a 1,2-epoxy equivalency greater than one and preferably about two, that is, polyepoxides which have on an average basis greater than one and about two epoxy groups per molecule. The preferred polyepoxides are polyglycidyl ethers of polyphenols or aromatic polyols such as bisphenol A. These polyepoxides can be produced by etherification of an aromatic polyol with epihalohydrin or dihalohydrin such as epichlorohydrin or dichlorohydrin in the presence of alkali. Examples of aromatic polyols are 2,2-bis-(4-hydroxyphenyl)propane, 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2hydroxynaphthyl)methane, 1,5-dihydroxynaphthalene or the like. Also, oxyalkylated adducts of the aromatic polyols such as ethylene and propylene oxide adducts of the aromatic polyols can be used as the polyol component.

The polyepoxides have molecular weights of at least about 350 and preferably within the range of 350 to 1500 and more preferably 350 to 1000.

The hydroxyalkyl-substituted urethane which is reacted with the polyepoxides are those in which the hydroxy group is in the beta position to the urethane group including ethoxylated derivatives thereof. Preferably, the hydroxyalkyl-substituted urethanes are poly(hydroxyalkyl)substituted urethane in which the hydroxy groups are in the beta position to the urethane group. If the hydroxy groups are not in the beta position or are not the ethoxylated derivatives thereof, chain extension is not efficient resulting in unreacted chain extender and chain branching.

Examples of such hydroxy-substituted urethanes are those of the structure:

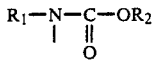

where $R_1$ and $R_2$ can be the same or different and include

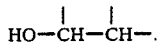

Preferably, $R_1$ and $R_2$ are selected from the class consisting of hydroxyethyl and hydroxypropyl. Preferably, the unsatisfied valence associated with the nitrogen in the structure above is selected from the class consisting of hydrogen, methyl, hydroxyethyl and hydroxypropyl.

The hydroxy-substituted urethane can be prepared by reacting a hydroxy-substituted amine of the structure

where $R_1$ is as described above with an ethylene carbonate of the structure:

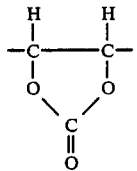

Examples of suitable amines are those containing from 2 to 20, preferably 2 to 10 carbon atoms such as hydroxyethylamine, hydroxypropylamine, N-methylhydroxyethylamine, N-methylhydroxypropylamine, bis(hydroxyethyl)amine, bis(hydroxypropyl)amine and mixtures of such amines. Preferably, the amine is of the structure:

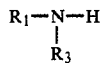

where $R_1$ is as described above and $R_3$ is selected from the class consisting of hydrogen, methyl, hydroxyethyl and hydroxypropyl.

Examples of suitable ethylene carbonates are those containing from 3 to 10, preferably 3 to 4 carbon atoms, and include ethylene carbonate itself, the homologues of ethylene carbonate such as propylene carbonate and butylene carbonate. Preferably, the ethylene carbonate will be of the structure:

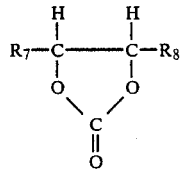

where $R_7$ is hydrogen and $R_8$ is hydrogen and methyl.

The hydroxy-substituted urethane described above can be easily prepared by slowly adding the hydroxy-substituted amine to the ethylene carbonate at a temperature of from about 35° to 100° C. and holding at this temperature until reaction is essentially complete as determined by amine analysis.

Besides the reaction products of hydroxyalkyl-substituted amines with the ethylene carbonate derivatives, the hydroxy-substituted urethane useful in the practice of the invention can also be prepared by reacting a 1,2-polyol with an organic polyisocyanate. Typically, these reaction products will have the following structural formula:

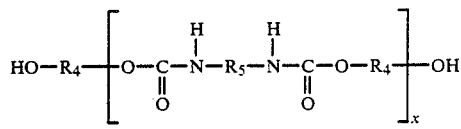

where $R_4$ is selected from the class consisting of ethylene, isopropylene and oxydiethylene (i.e., $-CH_2-CH_2-O-CH_2-CH_2-$); $R_5$ is a radical selected from the class consisting of aliphatic, oxaliphatic, cycloaliphatic and aromatic radicals and $x = 1$ to 3. Preferably, $x - 1$.

Examples of suitable 1,2-polyols are ethylene glycol, 1,2-propylene glycol, 1,2-butanediol, 1,2-hexanediol and hydrolyzed butyl glycidyl ether. Examples of suitable polyisocyanates are aliphatic, oxaliphatic, cycloaliphatic, aromatic, aliphatic aromatic and substituted aromatic polyisocyanates containing from 5 to 60 carbon atoms. Representative examples of polyisocyanates include trimethylene and hexamethylene diisocyanates; 1,3-cyclopentane and 1,4-cyclohexane diisocyanates; p-phenylene and 4,4'-diphenyl diisocyanates; 4,4'-diphenylene methane, 2,4- or 2,6-tolylene diisocyanates or mixtures thereof, and 1,4-xylylene diisocyanates and diphenylether diisocyanates and chlorodiphenylene diisocyanates.

Higher polyisocyanates such as triisocyanates, for example, triphenyl methane-4,4',4"-triisocyanate and polymerized polyisocyanates such as tolylene diisocyanate dimers and trimers can be used. Also, polymethylene polyphenyl isocyanates such as those of the structure:

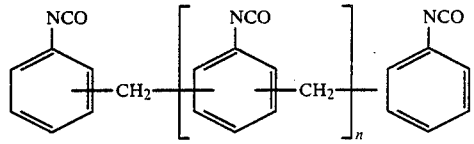

where $n = 1$ to 3 can be used.

The hydroxyalkyl-substituted urethanes described immediately above can be prepared by slowly adding the polyisocyanate to the 1,2-polyol optionally in the presence of a catalyst such as dibutyltin oxide and conducting the reaction at relatively low temperature, that is, from about 20° to 50° C. in an inert atmosphere and preferably in the presence of an inert organic solvent. Reaction is complete as evidenced by the disappearance of isocyanate functionality determined by Infra-Red (IR) analysis. Besides the poly(hydroxyalkyl)-substituted urethanes described above, mono(hydroxyalkyl)-substituted urethanes can be used such as those of the structure

preferably $R^9$ is hydroxyethyl and hydroxypropyl and the unsatisfied valence associated with the nitrogen in the structure above is selected from H and methyl. Such materials can be prepared by reacting ammonia or methylamine with an ethylene carbonate of the structure shown above. Such mono(hydroxyalkyl)-substituted urethanes contain two active hydrogens, i.e., —OH and

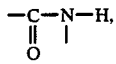

per molecule necessary for epoxy resin advancement with minimal competing reaction.

Chain extension or epoxy resin advancement can be accomplished by mixing the hydroxyalkyl-substituted urethane with the polyepoxide optionally in the presence of an inert solvent. Examples of such solvents are aromatic hydrocarbons, for example, toluene, xylene or ketones such as methyl ethyl ketone and methyl isobutyl ketone. Reaction is conducted usually at a temperature of from about 95° to 150° C., usually in the presence of a catalyst such as an amine.

The hydroxyalkyl-substituted urethane described above can be used as the sole chain extender for the polyepoxide or it can be used in combination with other chain extenders such as polymeric polyols, for example, polyester polyols such as described in U.S. Pat. No. 4,104,147 and polyether polyols such as described in U.S. Pat. No. 4,468,307 and polymercapto compounds such as described in U.S. Pat. No. 4,260,720. In general, the hydroxyalkyl-substituted urethanes should be present in amounts of at least 4 and preferably at least 8 percent by weight based on total weight of the chain extender. With regard to the relative amounts of the chain extender and polyepoxide, the equivalent ratio of chain extender (based on functional groups of the chain extender which are reactive with the polyepoxide) to polyepoxide should be less than one, preferably about 0.1 to about 0.8:1, more preferably 0.3 to 0.6:1. For the production of linear products which are preferred, chain extension of diepoxides and difunctional chain extenders should be used.

To incorporate cationic groups into the advanced epoxy resin, a cationic salt group former, for example, an amine and an acid, is reacted with the advanced epoxy resin. The amine can be primary, secondary or tertiary amine and mixtures thereof.

The preferred amines are monoamines, particularly hydroxyl-containing amines. Although monoamines are preferred, polyamines such as ethylene diamine, diethylene triamine, triethylene tetraamine, N-(2-aminoethyl)ethanolamine and piperizine can be used but their use in large amounts is not preferred because they are multifunctional and have a greater tendency to gel the reaction mixture than monoamines.

Tertiary and secondary amines are preferred to primary amines because the primary amines are polyfunctional with regard to reaction to epoxy groups and have a greater tendency to gel the reaction mixture. When using polyamines or primary amines, special precautions should be taken to avoid gelation. For example, excess amine can be used and the excess can be vacuum stripped at the completion of the reaction. Also, the polyepoxide resin can be added to the amine to insure that excess amine will be present.

Examples of hydroxyl-containing amines are alkanolamines, dialkanolamines, trialkanolamines, alkylalkanolamines, arylalkanolamines and arylalkylalkanolamines containing from 2 to 18 carbon atoms in the alkanol, alkyl and aryl chains. Specific examples include ethanolamine, N-methyl-ethanolamine, diethanolamine, N-phenylethanolamine, N,N-dimethylethanolamine, N-methyldiethanolamine and triethanolamine.

Amines which do not contain hydroxyl groups such as mono, di and tri-alkyl amines and mixed alkyl-aryl amines and substituted amines in which the substituents are other than hydroxyl and in which the substituents do not detrimentally affect the epoxy-amine reaction can also be used. Specific examples of these amines are ethylamine, propylamine, methylethylamine, diethylamine, N,N-dimethylcyclohexylamine, triethylamine, N-benzyldimethylamine, dimethylcocoamine and dimethyltallowamine. Also, amines such as hydrazine and propylene imine can be used. Ammonia can also be used and is considered for the purposes of this application to be an amine.

Mixtures of the various amines described above can be used. The reaction of the primary and/or secondary amine with the advanced epoxy resin takes place upon mixing the amine with the product. The reaction can be conducted neat, or optionally in the presence of suitable solvent. Reaction may be exothermic and cooling may be desired. However, heating to a moderate temperature, that is, within the range of 50° to 150° C., may be used to hasten the reaction.

The reaction product of the primary or secondary amine with the advanced epoxy resin attains its cationic character by at least partial neutralization with acid. Examples of suitable acids include organic and inorganic acids such as formic acid, acetic acid, lactic acid, phosphoric acid and carbonic acid. The extent of neutralization will depend upon the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used.

In the reaction of the tertiary amine with the advanced epoxy resin, the tertiary amine can be prereacted with the acid such as those mentioned above to form the amine salt and the salt reacted with the epoxy resin to form the quaternary ammonium salt group-containing resin. The reaction is conducted by mixing the amine salt and the polyepoxide resin together in the presence of water. Typically, the water is employed on the basis of about 1.75 to about 20 percent by weight based on total reaction mixture solids.

Alternately, the tertiary amine can be reacted with the epoxy resin in the presence of water to form a quaternary ammonium hydroxide group-containing polymer which, if desired, may be subsequently acidified. The quaternary ammonium hydroxide-containing polymers can also be used without acid, although their use is not preferred.

In forming the quaternary ammonium base group-containing polymers, the reaction temperature can be varied between the lowest temperature at which reaction reasonably proceeds, for example, room temperature, or in the usual case, slightly above room temperature, to a maximum temperature of 100° C. (at atmospheric pressure). At greater than atmospheric pressure, higher reaction temperatures can be used. Preferably, the reaction temperature ranges between about 60° to 100° C. Solvent for the reaction is usually not necessary, although a solvent such as a sterically hindered ester, ether or sterically hindered ketone may be used if desired.

In addition to the primary, secondary and tertiary amines disclosed above, a portion of the amine which is reacted with the epoxy resin can be the ketimine of a polyamine. This is described in U.S. Pat. No. 4,104,147 in column 6, line 23, to column 7, line 23, the portions of which are hereby incorporated by reference. The ketimine groups will decompose upon dispersing the amine-epoxy reaction product in water resulting in free primary amine groups which would be reactive with curing agents which are described in more detail below.

Besides resins containing amine salts and quaternary ammonium base groups, resins containing other cationic groups can be used in the practice of this invention. Examples of other cationic resins are quaternary phosphonium resins and ternary sulfonium resins is described in U.S. Pat. Nos. 3,894,922 and 3,959,106.

The extent of cationic group formation of the resin should be selected that when the resin is mixed with aqueous medium, a stable dispersion will form. A stable dispersion is one which does not settle or is one which is easily redispersible if some sedimentation occurs. In addition, the dispersion should be of sufficient cationic character that the dispersed resin particles will migrate towards the cathode when an electrical potential is impressed between an anode and a cathode immersed in the aqueous dispersion.

In general, most of the cationic resins prepared by the process of the invention contain from about 0.1 to 3.0, preferably from about 0.3 to 1.1 milliequivalents of cationic group per gram of resin solids.

The cationic resins of the present invention contain active hydrogens such as those derived from hydroxyl, primary and secondary amino which make them reactive at elevated temperatures with a curing agent. The curing agent which is used should be one which is stable in the presence of the cationic resin at room temperature but reactive with the active hydrogens at elevated temperatures, that is, from about 90° to 260° C., to form a crosslinked product. Examples of suitable curing agents are aminoplast resins, capped isocyanates and phenolic resins such as phenol-formaldehyde condensates including allyl ether derivatives thereof.

The preferred curing agents are the capped polyisocyanates and these are described in U.S. Pat. No. 4,104,147, column 7, line 36, continuing to column 8, line 37, the portions of which are hereby incorporated by reference.

Sufficient capped polyisocyanate is present in the coating system such that the equivalent ratio of latent isocyanate groups to active hydrogens is at least 0.1:1 and preferably about 0.3 to 1:1.

Besides the capped polyisocyanates, aminoplast resins can also be employed as curing agents in the practice of the present invention. Suitable aminoplasts for use with the reaction products are described in U.S. Pat. No. 3,937,679 to Bosso and Wismer in column 16, line 3, continuing to column 17, line 47, the portions of which are hereby incorporated by reference. As disclosed in the aforementioned portions of the '679 patent, the aminoplast can be used in combination with methylol phenol ethers. The aminoplast curing agents usually constitute from about 1 to 60 and preferably 5 to 40 percent by weight of the resinous composition based on total weight of aminoplast and the reaction product of a polyepoxide and amine. Also, mixed curing agents such as mixtures of capped polyisocyanates and aminoplast resins can be used.

The cationic resins are nongelled and are employed in the form of aqueous dispersions. The term "dispersion" as used within the context of the present invention is believed to be a two-phase, transparent, translucent or opaque aqueous resinous system in which the resin is the dispersed phase and water is the continuous phase. Average particle size diameter of the resinous phase is generally less than 10 and preferably less than 5 microns. The concentration of the resinous phase in the aqueous medium depends upon the particular end use of the dispersion and in general is not critical. For example, the aqueous dispersion preferably contains at least 0.5 and usually from about 0.5 to 50 percent by weight resin solids. By nongelled is meant the reaction products are substantially free of crosslinking and have an intrinsic viscosity when dissolved in a suitable solvent. The intrinsic viscosity of the reaction product is an indication of its molecular weight. A gelled reaction product, on the other hand, since it has essentially infinitely high molecular weight, will have an intrinsic viscosity too high to measure.

Besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxy-2-pentanone, ethylene and propylene glycol, and the monoethyl, monobutyl and monohexyl ethers of ethylene glycol. The amount of coalescing solvent is not unduly critical and is generally between about 0.01 and 40 percent by weight, preferably about 0.05 to about 25 percent by weight based on total weight of the aqueous medium.

In some instances, a pigment composition and, if desired, various additives such as plasticizers, surfactants or wetting agents are included in the dispersion. The pigment composition may be any of the conventional types, comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as pigment-to-resin ratio. In the practice of the invention, the pigment-to-resin ratio is usually within the range of 0.02 to 1:1. The other additives mentioned above are usually in the dispersion in amounts of 0.01 to 10 percent by weight based on total weight of resin solids.

Also, soluble lead such as lead acetate may be added to the dispersion. See, for example, U.S. Pat. No. 4,115,226.

When the aqueous dispersions as described above are employed for use in electrodeposition, the aqueous dispersion is placed in contact with an electrically conductive anode and an electrically conductive cathode with the surface to be coated being the cathode. Following contact with the aqueous dispersion, an adherent film of the coating composition is deposited on the cathode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, but typically between 50 and 500 volts. The current density is usually between 0.5 ampere and 15 amperes per square foot and tends to decrease during electrodeposition indicating the formation of an insulating film.

The aqueous resinous dispersions of the present invention can also be used in other conventional coating applications such as flow, dip, spray and roll coating applications. For electrodeposition and the other conventional coating applications, the coating compositions can be applied to a variety of electroconductive substrates especially metal such as steel, aluminum, copper, magnesium and the like, but also including metallized plastic and conductive carbon-coated materials. For the other conventional coating applications, the compositions can be applied to the non-metallic substrates such as glass, wood and plastic.

After the coating has been applied by electrocoating or other conventional coating applications, it is cured usually by baking at elevated temperatures such as 90° to 260° C. for about 1 to 30 minutes.

Illustrating the invention are the following examples, which, however, are not to be construed as limiting the invention to their details. All parts and percentages in the examples as well as throughout the specification are by weight unless otherwise indicated.

EXAMPLES

The following examples (A–G) show the preparation of various poly(hydroxyalkyl)-substituted urethane chain extenders.

EXAMPLE A

This example shows the preparation of a bis(hydroxyethyl) urethane from reacting monoethanolamine with ethylene carbonate in about a 1:1 molar ratio.

| Ingredients | Parts by Weight (in grams) |
| --- | --- |
| Ethylene carbonate | 2597.0 |
| Monoethanolamine (dry) | 1782.0 |

The ethylene carbonate was charged to a reaction vessel and heated under a nitrogen atmosphere to 50° C. The monoethanolamine was added over a two-hour period while maintaining the reaction temperature between 65° and 70° C. At the completion of the addition, the reaction mixture was heated to 85° C. for about 7 hours to reduce the amine equivalent to 0.099 milliequivalents of amine per gram. The reaction product had a hydroxyl value of 764.6 (theoretical 753).

EXAMPLE B

This example shows the preparation of a bis(hydroxyethyl) urethane from reacting N-methylethanolamine with ethylene carbonate in about a 1:1 molar ratio as follows:

| Ingredients | Parts by Weight (in grams) |
| --- | --- |
| Ethylene carbonate | 915.2 |
| N-methylethanolamine | 742.9 |

The ethylene carbonate was charged to a reaction flask and heated under a nitrogen atmosphere to 50° C. The N-methylethanolamine was added over a two-hour period while holding the reaction temperature between 65° and 70° C. At the completion of the addition, the temperature was adjusted to 70° C. and held at this temperature for 9 hours to reduce the amine equivalent to 0.204 milliequivalents of amine per gram. The reaction product had a hydroxyl value of 670 (theoretical 689).

EXAMPLE C

The following example shows the preparation of a Michael adduct of monoethanolamine and 2-ethylhexyl acrylate. The Michael adduct was then reacted with ethylene carbonate to form a bis(hydroxyethyl) urethane diol. The Michael adduct was prepared as follows:

| Ingredients | Parts by Weight (in grams) |
| --- | --- |
| Monoethanolamine (dry) | 323.3 |
| 2-ethylhexyl acrylate | 975.2 |

The monoethanolamine was charged to a reaction vessel and heated under a nitrogen atmosphere to 70° C. The 2-ethylhexyl acrylate was added over a two-hour period. The reaction mixture exothermed and the temperature was maintained between 65° and 70° C. during the addition. At the completion of the addition, the reaction mixture was held at 70° C. for one hour followed by heating to 80° C. and holding for two hours. The reaction mixture contained 3.450 milliequivalents of amine per gram of resin.

The Michael adduct prepared as described above was reacted with ethylene carbonate in about a 1:1 molar ratio as follows:

| Ingredients | Parts by Weight |
| --- | --- |
| Ethylene carbonate | 214.6 |
| Michael adduct | 700.0 |

The ethylene carbonate was charged to a reaction flask and heated under a nitrogen atmosphere to 50° C. The Michael adduct was added over a two-hour period while maintaining the reaction temperature between 65° and 70° C. At the completion of addition, the reaction mixture was held at 70° C. for 7 hours to reduce the amine equivalent to 0.551 milliequivalents of amine per gram of resin.

EXAMPLE D

A tris(hydroxyethyl)-substituted urethane was prepared by reacting diethanolamine and ethylene carbonate as follows:

| Ingredients | Parts by Weight (in grams) | Solids (in grams) | Equivalents |
| --- | --- | --- | --- |
| Ethylene carbonate | 915.2 | 915.2 | 10.4 |
| Diethanolamine | 1040.0 | 1040.0 | 9.905 |

The ethylene carbonate was charged to a reaction vessel and heated under a nitrogen atmosphere to 50° C. The diethanolamine was then added over a two-hour period holding the reaction temperature at 65° to 70° C. At the completion of addition, the reaction temperature was adjusted to 70° C. and held for 7 hours to reduce the amine equivalent to 0.107 milliequivalent of amine per gram. The reaction product had a hydroxyl value of 868.9 (theoretical 806).

EXAMPLE E

A bis(hydroxyethyl)-substituted urethane was prepared by reacting ethylene glycol and 1,6-hexamethylene diisocyanate as follows:

| Ingredients | Parts by Weight (in grams) | Equivalents |
| --- | --- | --- |
| Ethylene glycol | 62.7 | 2.023 |
| Tetrahydrofuran | 98.5 | — |
| Dibutyltin dilaurate | 0.04 | — |
| 1,6-hexamethylene diisocyanate | 85.0 | 1.011 |

The ethylene glycol, tetrahydrofuran and dibutyltin dilaurate were charged to a reaction vessel and heated under a nitrogen atmosphere to 30° C. The 1,6-hexamethylene diisocyanate was then added over a one-hour period while maintaining the reaction mixture at a temperature of 30° to 35° C. When addition was complete, the reaction mixture was held at 35° to 40° C. until an Infra-Red (IR) analysis indicated the disappearance of NCO groups. The reaction mixture was then thinned with an additional 50 grams of tetrahydrofuran. The reaction product was a white pasty material. The tetrahydrofuran was allowed to evaporate over several days. The solids content was 91.8 percent with a hydroxyl value of 366 (theoretical 353).

EXAMPLE F

An ethoxylated derivative of a bis(hydroxyethyl)-substituted urethane was prepared by reacting diethylene glycol and 1,6-hexamethylene diisocyanate as follows:

| Ingredients | Parts by Weight (in grams) | Equivalents |
| --- | --- | --- |
| Diethylene glycol | 107.2 | 2.023 |
| Tetrahydrofuran | 82.4 | — |
| Dibutyltin dilaurate | 0.04 | — |
| 1,6-hexamethylene diisocyanate | 85.0 | 1.011 |

The diethylene glycol, tetrahydrofuran and dibutyltin dilaurate were charged to a reaction vessel and heated under a nitrogen atmosphere to 30° C. followed by the addition of the 1,6-hexamethylene diisocyanate over a one-hour period while maintaining the reaction mixture temperature at 30° to 35° C. At the completion of the addition, the reaction mixture was held at 35° to 40° C. until an IR analysis indicated the disappearance of NCO functionality. The reaction product was a white pasty material and the solvent was allowed to evaporate over several days to a solids content of 90.2. The hydroxyl number was 270 (theoretical 266).

EXAMPLE G

A bis(hydroxybutyl)-substituted urethane was prepared from the following ingredients:

| Ingredients | Parts by Weight (in grams) | Equivalents |
| --- | --- | --- |
| 1,4-butanediol | 91.0 | 2.023 |
| Tetrahydrofuran | 75.4 | — |
| Dibutyltin dilaurate | 0.04 | — |
| 1,6-hexamethylene diisocyanate | 85.0 | 1.011 |

The 1,4-butanediol, tetrahydrofuran and dibutyltin dilaurate were charged to a reaction vessel and heated under a nitrogen atmosphere to 30° C. followed by the addition of the 1,6-hexamethylene diisocyanate over a one-hour period while maintaining the reaction mixture temperature at 30° to 35° C. At the completion of the addition, the reaction mixture was held at 35° to 40° C. until an IR analysis indicated the disappearance of NCO functionality. The reaction mixture was recovered as a waxy, white, clumpy solid material. The solvent was permitted to evaporate over a period of several days to a solids content of 84.7 percent. The hydroxyl number was 310 (theoretical 273).

The following examples show the advancement of polyepoxides with various poly(hydroxyethyl)-substituted urethanes in accordance with the present invention (Examples I–IX) and for the purposes of comparison with various other chain extenders outside the scope of the present invention, i.e., Comparative Examples Ia, Ib and VIIa and IXa. The advanced epoxy resins were further reacted with amines and in certain instances neutralized with acid to form cationic resins.

EXAMPLE I

The following example shows the advancement of the diglycidyl ether of bisphenol A (EPON 828) with the bis(hydroxyethyl)-substituted urethane of Example A (ethylene carbonate-monoethanolamine reaction product). The chain-extended reaction product was then further reacted with monoethanolamine and the diketimine of diethylenetriamine. The reaction product was prepared as follows:

| Ingredients | Parts by Weight (in grams) | Solids (in grams) | Equivalents |
| --- | --- | --- | --- |
| EPON 828[1] | 912.8 | 912.8 | 4.855 (epoxy) |
| Bis(hydroxyethyl)-substituted urethane of Example A | 287.2 | 287.2 | 3.855 (hydroxyl) |
| Benzyldimethylamine | 2.4 | — | — |
| Methyl isobutyl ketone | 207.8 | — | — |
| Diketimine of diethylenetriamine[2] | 79.5 | 57.4 | 0.215 (sec. amine) |
| N-methylethanolamine | 58.9 | 58.9 | 0.785 (sec. amine) |

[1] Diglycidyl ether of bisphenol A having an epoxy equivalent of about 188 available from Shell Chemical Co.
[2] Reaction product of diethylenetriamine and methyl isobutyl ketone dissolved in methyl isobutyl ketone.

The EPON 828 and bis(hydroxyethyl)-substituted urethane chain extender were charged to a reaction vessel and heated under a nitrogen atmosphere to 135° C. The benzyldimethylamine catalyst was added and the reaction mixture began to exotherm. The temperature of the reaction mixture was adjusted to 145° C. and held until an epoxy equivalent of about 1162 was obtained. The methyl isobutyl ketone, diketimine derivative and N-methylethanolamine were added to the reaction vessel and the temperature adjusted to 125° C. and held at this temperature for one hour until a reduced Gardner-Holdt viscosity (60 percent resin solids solution in 1-methoxy-2-propanol; all reduced viscosities measured in 1-methoxy-2-propanol and usually 50 percent solids unless otherwise indicated) of O was obtained. The reaction mixture had a solids content of 80.2 percent, contained essentially no unreacted urethane diol, had a number average molecular weight of 903, weight average molecular weight of 1825 and a polydispersity of 2.02; the molecular weight being determined by gel permeation chromatography using a polystyrene standard.

COMPARATIVE EXAMPLE Ia

The following example shows the advancement of an epoxy resin in a manner similar to that of Example I but with the exception that the chain extender was a polycaprolactone diol instead of the bis(hydroxyethyl)-substituted urethane. The chain-extended resin was prepared from the following ingredients:

| Ingredients | Parts by Weight (in grams) | Solids (in grams) | Equivalents |
| --- | --- | --- | --- |
| EPON 828 | 637.0 | 637.0 | 3.388 |
| Polycaprolactone diol[1] | 606.0 | 606.0 | 2.352 (hydroxyl) |
| Benzyldimethylamine | 6.2 | — | — |
| Methyl isobutyl ketone | 211.5 | — | — |
| Diketimine derivative as used in Example I | 82.4 | 59.5 | 0.223 |
| N-methylethanolamine | 61.0 | 61.0 | 0.813 |

[1]PCP-0200 available from Union Carbide Corporation.

The EPON 828 and PCP-0200 were charged to a reaction vessel and heated under a nitrogen atmosphere to 135° C. The benzyldimethylamine was then added followed by adjusting the temperature to 145° C. and holding at this temperature until an epoxy equivalent of about 1173 was obtained. The methyl isobutyl ketone, diketimine derivative and N-methylethanolamine were then added and the temperature of the reaction mixture adjusted to 125° C. and held at this temperature for about one hour. The reaction mixture had a reduced Gardner-Holdt viscosity of I+. The reaction mixture contained a considerable amount of unreacted polycaprolactone diol. The reaction product had a number average molecular weight of 1200, a weight average molecular weight of 4772 and a Polydispersity of 3.96.

COMPARATIVE EXAMPLE Ib

The following example shows advancement of an epoxy resin in a manner similar to that of Example I but with the exception that a polyether diol was used as the chain extender instead of the bis(hydroxy- ethyl)-substituted urethane. The chain-extended epoxy resin was prepared from the following ingredients:

| Ingredients | Parts by Weight (in grams) | Solids (in grams) | Equivalents |
| --- | --- | --- | --- |
| EPON 828 | 637.0 | 637.0 | 3.388 |
| Polyether diol[1] | 563.0 | 563.0 | 2.389 (hydroxyl) |
| Benzyldimethylamine | 6.0 | — | — |
| Methyl isobutyl ketone | 204.2 | — | — |
| Diketimine derivative as used in Example I | 79.5 | 57.4 | 0.215 |

-continued

| Ingredients | Parts by Weight (in grams) | Solids (in grams) | Equivalents |
| --- | --- | --- | --- |
| N-methylethanolamine | 58.9 | 58.9 | 0.785 |

[1]Polyether diol formed from condensing bisphenol A with ethylene oxide (1/7 molar ratio), hydroxyl value = 238.

The EPON 828 and polyether diol were charged to a reaction vessel and heated under a nitrogen atmosphere to 135° C. followed by the addition of the benzyldimethylamine catalyst. The reaction temperature was adjusted to 145° C. and held at this temperature until an epoxy equivalent of about 1213 was obtained. The reaction mixture was thinned with the methyl isobutyl ketone, cooled to 105° C., followed by the addition of the diketimine derivative and the N-methylethanolamine. The reaction mixture was heated to 120°-125° C. and held at this temperature for one hour. The reaction mixture had a reduced Gardner-Holdt viscosity of D+ and a solids content of 83.5 percent. The reaction mixture contained a considerable amount of unreacted polyether polyol. The reaction product had a number average molecular weight of 985, a weight average molecular weight of 4006 and a polydispersity of 4.15.

Examples I, Ia and Ib show that the bis(hydroxyethyl) urethane reacts more completely with the polyepoxide and results in a lower molecular weight product compared to the polycaprolactone diol and the polyether diol.

EXAMPLE II

The following example shows advancement of a polyepoxide with the bis(hydroxyethyl)-substituted urethane of Examples A and B. The chain-extended polyepoxide was further reacted with amine, combined with polyurethane crosslinker and neutralized with acid to form a cationic electrodepositable resin.

| Ingredients | Parts by Weight (in grams) | Solids (in grams) | Equivalents |
| --- | --- | --- | --- |
| EPON 828 | 902.9 | 902.9 | 4.803 |
| Bis(hydroxyethyl)-substituted urethane of Example B (ethylene carbonate-N-methylethanolamine reaction product) | 230.9 | 230.9 | 2.739 (hydroxyl) |
| Bis(hydroxyethyl)-substituted urethane of Example A (ethylene carbonate-ethanolamine reaction product) | 100.5 | 100.5 | 1.370 |
| Methyl isobutyl ketone | 65.0 | — | — |
| Benzyldimethylamine | 1.7 | — | — |
| Diketimine derivative as used in Example I | 98.3 | 71.0 | 0.266 |
| N-methylethanolamine | 39.8 | 39.8 | 0.53 |
| Polyurethane crosslinker[1] | 1034.7 | 724.3 | — |

[1]Polyurethane crosslinker formed from half-capping toluene diisocyanate (80/20 2,4-/2,6-isomer mixture) with 2-hexoxyethanol and reacting this product with trimethylolpropane in a 3:1 molar ratio. The crosslinker is present as a 70 percent solids solution in methyl isobutyl ketone and butanol (9:1 weight ratio).

The EPON 828, bis(hydroxyethyl)-substituted urethane diol and methyl isobutyl ketone were charged to a reaction vessel and heated under a nitrogen atmosphere to 100° C. The benzyldimethylamine was then added and the reaction mixture began to exotherm. The temperature was adjusted to 110° C. and held at this temperature until an epoxy equivalent of 1447 was obtained. The diketimine derivative and N-methylethanolamine were then added; the temperature of the reaction mixture adjusted to 120° C. and held for one hour at this temperature. The reaction mixture had a reduced (50 percent) Gardner-Holdt viscosity of Q+. The polyurethane crosslinker was then added and mixed into the reaction mixture. The reaction mixture was then neutralized with lactic acid as it dispersed in deionized water as follows:

| Ingredients | Parts by Weight (in grams) |
| --- | --- |
| Reaction mixture | 2175 |
| Deionized water | 1056.5 |
| 88% aqueous lactic acid | 50.2 (42% total theoretical neutralization) |
| Surfactant[1] | 28.7 |
| Deionized water | 776.0 |
| Deionized water | 1167.6 |

[1]The cationic surfactant was prepared by blending 120 parts of alkyl imidazoline commercially available from Geigy Industrial Chemicals as GEIGY AMINE C, 120 parts by weight of an acetylenic alcohol commercially available from Air Products and Chemicals, Inc. as SURFYNOL 104, 120 parts by weight of 2-butoxyethanol and 221 parts by weight of deionized water and 19 parts by weight of glacial acetic acid.

The reaction mixture was preheated to 90° C. and poured into and mixed with a mixture of the first portion of deionized water, lactic acid and the surfactant. The reaction mixture was subsequently diluted with the remaining portions of the deionized water and the solvent removed by vacuum distillation (21 inches mercury) at 63° C. The solids of the solvent stripped dispersion was 35.2 percent.

EXAMPLE III

A cationic advanced epoxy resin was prepared in a manner similar to that of Example II with the exception that the chain extender was a mixture of bisphenol A and the bis(hydroxyethyl)-substituted urethane of Example A.

| Ingredients | Parts by Weight (in grams) | Solids (in grams) | Equivalents |
| --- | --- | --- | --- |
| EPON 828 | 831.0 | 831.0 | 4.420 |
| Bisphenol A | 144.6 | 1446.6 | 1.269 (phenolic hydroxyl) |
| Bis(hydroxyethyl)-substituted urethane chain extender of Example A | 183.8 | 183.8 | 2.505 |
| Methyl isobutyl ketone | 59.0 | — | — |
| Benzyldimethylamine | 0.6 | — | — |
| Benzyldimethylamine | 1.4 | — | — |
| Diketimine derivative as in Example I | 90.6 | 65.3 | 0.245 |
| N-methylethanolamine | 32.8 | 32.8 | 0.437 |
| Polyurethane crosslinker as in Example II | 967.3 | 677.1 | — |

The EPON 828, bisphenol A, bis(hydroxyethyl)-substituted urethane and methyl isobutyl ketone were charged to a reaction vessel and heated under a nitrogen atmosphere to 120° C. The first portion of the benzyldimethylamine catalyst was added, the reaction temperature adjusted to 135° C. and held at this temperature for 30 minutes. The reaction mixture was cooled to 110° C. followed by the addition of the second portion of the benzyldimethylamine catalyst and held at 110° C. until an epoxy equivalent of about 1732 was obtained. The diketimine derivative and N-methylethanolamine were then added; the reaction temperature adjusted to 115° C. and held for one hour. The reaction mixture had a reduced (50 percent) Gardner-Holdt viscosity of I. The polyurethane crosslinker was then mixed into the reaction mixture.

The reaction mixture was then neutralized with acid and dispersed in deionized water by pouring and mixing 2025 grams of the resinous reaction mixture heated to a temperature of 90° C. into a mixture of 999.5 parts of deionized water, 30.8 grams of 88 percent aqueous lactic acid and 26.7 grams of the surfactant of Example II. The reaction mixture was diluted with an additional 1836.4 grams of deionized water and then vacuum stripped at 22 inches of mercury at 61° C. to remove organic solvent. The solids of the solvent stripped dispersion was about 36 percent.

EXAMPLE IV

A cationic advanced epoxy resin similar to that of Example II was prepared with the exception that the chain extender was a mixture of the bis(hydroxyethyl) urethanes of Examples A and C.

| Ingredients | Parts by Weight (in grams) | Solids (in grams) | Equivalent |
| --- | --- | --- | --- |
| EPON 828 | 777.4 | 777.4 | 4.135 |
| Bis(hydroxyethyl)-substituted urethane chain extender of Example C (ethylene carbonate-Michael adduct of monoethanolamine and 2-ethylhexyl acrylate reaction product) | 379.9 | 379.9 | 2.358 (includes 0.209 equivalents of amine) |
| Bis(hydroxyethyl)-substituted urethane of Example A | 86.6 | 86.6 | — |
| Methyl isobutyl ketone | 64.0 | — | — |
| Benzyldimethylamine | 1.5 | — | — |
| Diketimine derivative of Example I | 99.1 | 71.6 | 0.268 |
| N-methylethanolamine | 40.1 | 40.1 | 0.534 |
| Polyurethane crosslinker of Example II | 1068.7 | 729.9 | — |

The EPON 828, the bis(hydroxyethyl)-substituted urethanes and the methyl isobutyl ketone were charged to a reaction vessel and heated under a nitrogen atmosphere to 125° C. and held at this temperature for 30 minutes. The reaction mixture was then cooled to 110° C. followed by the addition of the benzyldimethylamine. The reaction mixture was held at 110° C. until an epoxy equivalent of about 1534.0 was obtained. The diketimine derivative and monoethanolamine were then added, the temperature adjusted to 120° C. and held at this temperature for one hour. The reaction mixture had a reduced Gardner-Holdt viscosity of G/H. The polyurethane crosslinker was then mixed into the reaction mixture.

The resinous reaction product prepared as described above was neutralized and dispersed in deionized water by pouring and mixing 1841.6 grams of the heated reaction mixture into a mixture of 1045.7 grams of deionized water, 50.7 grams of 88 percent aqueous lactic acid and 29.0 grams of the surfactant of Example II. The reaction mixture was then diluted with an additional 1965.9 grams of deionized water and vacuum stripped to remove organic solvent. The solids content of the solvent stripped dispersion was about 37 percent.

EXAMPLE V

A cationic advanced epoxy resin similar to that of Example II was prepared with the exception that the chain extender was a mixture of the tris(hydroxyethyl) urethane of Example D and the bis(hydroxyethyl) urethane of Example A. The resin was prepared as follows:

| Ingredients | Parts by Weight (in grams) | Solids (in grams) | Equivalents |
|---|---|---|---|
| EPON 828 | 938.3 | 938.3 | 4.991 |
| ARMEEN 16D[1] | 97.3 | 97.3 | 0.843 (amine) |
| Bis(hydroxyethyl)-substituted urethane of Example A | 144.7 | 144.7 | 1.972 |
| Tris(hydroxyethyl)-substituted urethane of Example D (ethylene carbonate-diethanol-amine reaction product) | 91.4 | 91.4 | 1.415 |
| Methyl isobutyl ketone | 65.0 | — | — |
| Benzyldimethylamine | 1.0 | — | — |
| Diketimine derivative of Example I | 96.1 | 69.5 | 0.260 |
| N-methylethanolamine | 44.1 | 44.1 | 0.588 |
| Polyurethane crosslinker of Example II | 1065.6 | 745.9 | — |

[1]ARMEEN 16D is hexadecylamine available from Armak Chemicals, division of AKZO Chemie America.

The EPON 828, ARMEEN 16D, urethane polyol chain extenders and methyl isobutyl ketone were charged to a reaction vessel and heated under a nitrogen atmosphere to 130° C. The reaction mixture was held at this temperature for 45 minutes, cooled to 110° C., followed by the addition of the benzyldimethylamine. The reaction mixture was held at 110° C. until an epoxy equivalent of about 1649 was obtained. The diketimine derivative and N-methylethanolamine were added to the reaction mixture, the temperature adjusted to 115° C. and held at this temperature for one hour. The reaction mixture had a reduced (50 percent) Gardner-Holdt viscosity of K. The polyurethane crosslinker was then blended into the reaction mixture. The reaction mixture was neutralized with acid and dispersed in deionized water by mixing and pouring 2250 grams of the heated resinous reaction mixture (115° C.) into a mixture of 1104 grams of deionized water, 42.8 grams of glacial acetic acid and 29.7 grams of the surfactant of Example II. The reaction mixture was thinned with an additional 2011.8 grams of deionized water and vacuum stripped at 66° C. and 21-22 inches of mercury to remove organic solvent. The solids content of the solvent stripped dispersion was 34.6 percent.

EXAMPLE VI

An advanced epoxy resin similar to that of Example I was prepared with the exception that the chain extender was that of Example E (ethylene glycol-1,6-hexamethylene diisocyanate reaction product).

| Ingredients | Parts by Weight (in grams) | Solids (in grams) | Equivalents |
|---|---|---|---|
| Chain extender of Example E | 61.4 | 56.4 | 0.400 (hydroxyl) |
| EPON 828 | 105.8 | 105.8 | 0.563 |
| Methyl isobutyl ketone | 12.6 | — | — |
| Benzyldimethylamine | 0.47 | — | — |
| N-methylethanolamine | 12.2 | 12.2 | 0.162 |

The chain extender, EPON 828 and methyl isobutyl ketone were charged to a reaction vessel and heated under a nitrogen atmosphere to 130° C. The benzyldimethylamine catalyst was added and the reaction mixture exothermed. The reaction mixture was held at 130° C. for 90 minutes until an epoxy equivalent of about 975 was obtained. The N-methylethanolamine was then added and the reaction temperature adjusted to 125° C. and held for one hour. The reaction mixture had a reduced (50 percent) Gardner-Holdt viscosity of L.

EXAMPLE VII

An advanced epoxy resin was prepared as generally described in Example I with the exception that the urethane chain extender was that of Example F (diethylene glycol-1,6-hexamethylene diisocyanate reaction product).

| Ingredients | Parts by Weight (in grams) | Solids (in grams) | Equivalents |
|---|---|---|---|
| EPON 828 | 98.8 | 98.8 | 0.526 |
| Chain extender of Example F | 74.7 | 67.4 | — |
| Methyl isobutyl ketone | 10.7 | — | — |
| Benzyldimethylamine | 0.48 | — | — |
| N-methylethanolamine | 12.5 | 12.5 | 0.166 |

The EPON 828, chain extender and methyl isobutyl ketone were charged to a reaction vessel and heated under a nitrogen atmosphere to 130° C. The benzyldimethylamine was added and the reaction mixture exothermed. The reaction mixture was held at 130° C. for 120 minutes until an epoxy equivalent of about 1080.5 was obtained. The N-methylethanolamine was added, the temperature adjusted to 125° C. and the reaction mixture held at this temperature for one hour. The reduced (50 percent) Gardner-Holdt viscosity of the reaction mixture was H−.

COMPARATIVE EXAMPLE VIIa

An advanced epoxy resin similar to that of Example I but outside the scope of the present invention was prepared with the chain extender of Example G (1,4-butanediol-1,6-hexamethylene diisocyanate reaction product).

| Ingredients | Parts by Weight (in grams) | Solids (in grams) | Equivalents |
|---|---|---|---|
| EPON 828 | 105.6 | 105.6 | 0.562 |
| Chain extender of Example G | 71.6 | 60.6 | 0.396 (hydroxyl) |
| Methyl isobutyl ketone | 7.0 | — | — |
| Benzyldimethylamine | 0.48 | — | — |
| N-methylethanolamine | 12.5 | 12.5 | 0.166 |

The EPON 828, chain extender and methyl isobutyl ketone were charged to a reaction vessel and heated under a nitrogen atmosphere to 130° C. The benzyldimethylamine catalyst was then added and the reaction mixture held at this temperature for 3 hours until an epoxy equivalent of about 947.8 was obtained. The N-methylethanolamine was then added, the temperature adjusted to 125° C. and the reaction mixture held at this temperature for one hour. The reaction mixture was a waxy solid.

Examples VI, VII and Comparative Example VIIa show that chain extension is much faster with poly(hydroxyalkyl) urethanes of Examples VI and VII in which the hydroxy groups are beta to the urethane (VI) or an ethoxylated derivative thereof (VII) than with the poly(hydroxybutyl) urethane of Comparative Example VIIa in which the hydroxy group is in the delta position to the urethane group. The reaction rates were 6.8, 6.4 and 3.7 grams per equivalent per minute respectively.

EXAMPLE VIII

An advanced cationic epoxy resin similar to that of Example III was prepared with the exception that a different polyurethane crosslinker was used (2-ethylhexanol as the capping agent instead of 2-hexoxyethanol).

| Ingredients | Parts by Weight (in grams) | Solids (in grams) | Equivalents |
|---|---|---|---|
| EPON 828 | 855.0 | 855.0 | 4.548 |
| Bisphenol A | 149.2 | 149.2 | 1.309 |
| Bis(hydroxyethyl)-substituted chain extender of Example A | 179.8 | 179.8 | 2.450 |
| Methyl isobutyl ketone | 57.7 | — | — |
| Benzyldimethylamine | 1.2 | — | — |
| Benzyldimethylamine | 0.6 | — | — |
| Polyurethane crosslinker[1] | 1001.0 | 697.7 | — |
| Diketimine derivative as in Example I | 79.9 | 56.6 | 0.212 |
| N-methylethanolamine | 55.1 | 55.1 | 0.735 |

[1] Polyurethane crosslinker formed from half-capping toluene diisocyanate (80/20 2,4-/2,6-isomer mixture) with 2-ethylhexanol and reacting this product with trimethylolpropane in a 3:1 molar ratio. The crosslinker is present as a 70 percent solids solution in methyl isobutyl ketone.

The EPON 828, bisphenol A, chain extender and methyl isobutyl ketone were charged to a reaction vessel and heated under a nitrogen atmosphere to 120° C. followed by the addition of the first portion of benzyldimethylamine. The reaction mixture was heated to reflux at 184° C. and held at reflux for 30 minutes. The reaction mixture was then cooled to 120° C., held for 45 minutes, followed by the addition of the second portion of the benzyldimethylamine. The reaction mixture was held at 120° C. until an epoxy equivalent of about 1283 was obtained. The polyurethane crosslinker, diketimine additive and N-methylethanolamine were then added, the temperature of the reaction mixture adjusted to 110° C. and the reaction mixture held at this temperature for one hour. The reduced (60 percent) Gardner-Holdt viscosity of the reaction mixture was V. The reaction product was then neutralized and dispersed in water by mixing and pouring 2075 grams of the heated reaction mixture (110° C.) into a mixture of 1002.8 parts of deionized water, 62.5 parts of 88 Percent lactic acid and 27.3 parts of the surfactant of Example II. The reaction mixture was then thinned with an additional 1853.3 grams of deionized water to form a resinous dispersion having a solids content of about 35 percent. The dispersion was stripped of solvent and replenished with deionized water as described above to give a dispersion having a solids content of 35.8 percent.

EXAMPLE IX

An advanced cationic epoxy resin similar to that of Example III was prepared but using a mixture of chain extenders, namely, a polycaprolactone diol and the bis(hydroxyethyl)-substituted urethane of Example A with the urethane chain extender constituting only 9.1 percent by weight of the total chain extender.

| Ingredients | Parts by Weight (in grams) | Solids (in grams) | Equivalents |
|---|---|---|---|
| EPON 828 | 685.3 | 685.3 | 3.645 |
| Bisphenol A | 119.6 | 119.6 | 1.049 |
| PCP-0200 | 344.6 | 344.6 | 1.337 |
| Bis(hydroxyethyl)-substituted urethane of Example A | 34.5 | 34.5 | 0.47 |
| Methyl isobutyl ketone | 57.1 | — | — |
| Benzyldimethylamine | 1.2 | — | — |
| Benzyldimethylamine | 2.0 | — | — |
| Polyurethane crosslinker as used in Example VIII | 1001.0 | 697.7 | — |
| Diketimine derivative of Example I | 80.0 | 56.6 | 0.212 |
| N-methylethanolamine | 55.1 | 55.1 | 0.735 |

The EPON 828, bisphenol A, PCP-0200, chain extender and methyl isobutyl ketone were charged to a reaction vessel and heated under a nitrogen atmosphere to 120° C. followed by the addition of the benzyldimethylamine catalyst. The reaction mixture was heated to reflux at 200° C. and held at reflux for 30 minutes. The reaction mixture was then cooled to 120° C. and held at this temperature for 45 minutes. The second portion of benzyldimethylamine catalyst was added and the reaction mixture held at 120° C. until an epoxy equivalent of about 1267 was obtained. The polyurethane crosslinker, diketimine derivative and N-methylethanolamine were added, the temperature of the reaction mixture adjusted to 110° C. and the reaction mixture held at this temperature for about one hour. The reduced (60 percent) Gardner-Holdt viscosity of the reaction product was X+.

The resinous reaction product was neutralized and dispersed in water by pouring and mixing 2075 grams of the heated resinous reaction mixture (110° C.) into a mixture of 993.1 grams of deionized water, 61.0 grams of 88 percent aqueous lactic acid and 27.3 grams of the surfactant mixture of Example II. The reaction mixture was thinned with an additional 1853.3 grams of deionized water to form a resinous dispersion having a solids content of about 35 percent. This dispersion was stripped of solvent and replenished with deionized water as described above to give a dispersion having a solids content of 33.6 percent.

COMPARATIVE EXAMPLE IXa

An advanced cationic epoxy resin similar to that of Example IX but outside the scope of the present invention was prepared with only the Polycaprolactone diol chain extender.

| Ingredients | Parts by Weight (in grams) | Solids (in grams) | Equivalents |
|---|---|---|---|
| EPON 828 | 644.7 | 644.7 | 3.429 |
| Bisphenol A | 112.2 | 112.2 | 0.984 |
| PCP-0200 | 426.7 | 426.7 | 1.656 |
| Methyl isobutyl ketone | 57.7 | — | — |
| Benzyldimethylamine | 1.2 | — | — |
| Benzyldimethylamine | 3.4 | — | — |
| Polyurethane crosslinker of Example VIII | 1007 | 697.5 | — |
| Diketimine derivative | 79.9 | 56.6 | 0.212 |
| N-methylethanolamine | 55.1 | 55.1 | 0.735 |

The EPON 828, bisphenol A, PCP-0200 and methyl isobutyl ketone were charged to a reaction vessel and heated under a nitrogen atmosphere to 120° C. followed by the addition of the first portion of the benzyldimethylamine catalyst. The reaction mixture heated to reflux at 195° C. and held at reflux for 30 minutes. The reaction mixture was then cooled to 120° C. and held at this temperature for 45 minutes. The second portion of the benzyldimethylamine catalyst was added and the reaction mixture held at 120° C. (catalyst adjustment of 1.7 grams was made) until an epoxy equivalent of about 1268 was obtained. The polyurethane crosslinker, diketimine derivative and N-methylethanolamine were then added, the temperature of the reaction mixture adjusted to 110° C. and held at this temperature for one hour. At this point the reduced (60 percent) Gardner-Holdt viscosity was Y+.

The resinous reaction product was then neutralized and dispersed in deionized water by pouring and mixing 2050 grams of the heated resinous reaction mixture (110° C.) into a mixture of 995.8 grams of deionized water, 60.4 grams of 88 percent lactic acid and 27.1 grams of the surfactant of Example II. The reaction mixture was then thinned with an additional 1830.9 grams of deionized water to form a resinous dispersion having a solids content of about 35 percent. This dispersion was stripped of solvent and replenished with deionized water as described above to give a dispersion having a solids content of 35.8 percent.

The following examples show the formulation of various cationic electrodeposition coating compositions using the various cationic resins of Examples II through V and VIII through IXa. In formulating the cationic electrodeposition paints, the following additives and pigment pastes (Examples h to p) were used.

EXAMPLE H

A polyoxyalkylenepolyamine-polyepoxide adduct having an amine to epoxide equivalent ratio of 1.34/1 was prepared as follows: A polyepoxide intermediate was first prepared by condensing EPON 829 and bisphenol A as follows:

| Ingredients | Parts by Weight |
|---|---|
| EPON 829 | 136.1 |
| Bisphenol A | 39.6 |
| 2-butoxyethanol | 52.3 |

The EPON 829 and bisphenol A were charged to a reaction vessel under a nitrogen blanket and heated to 160° to 190° C. for ½ hour. The reaction mixture was cooled to 150° C. and the 2-butoxyethanol added. The reaction mixture had a solids content of 76.5 percent and an epoxy equivalent of 500.

A polyoxypropylenediamine having a molecular weight of 2000 commercially available from Jefferson Chemical Company as JEFFAMINE D-2000 was reacted with a polyepoxide intermediate described above as follows:

| Ingredients | Parts by Weight |
|---|---|
| JEFFAMINE D-2000 | 5066.2 |
| Polyepoxide intermediate | 2601.4 |
| 2-butoxyethanol | 630.8 |
| 88% aqueous lactic acid | 210.72 |
| Deionized water | 10542.9 |

The JEFFAMINE D-2000 was charged to a reaction vessel under a nitrogen atmosphere and heated to 90° C. The polyepoxide intermediate was added over the period of about ½ hour. At the completion of the addition, the reaction mixture was heated to 130° C., held for 3 hours, followed by the addition of the 2-butoxyethanol. The reaction mixture was then dispersed by blending with the lactic acid and deionized water. The dispersion had a solids content of 37.8 percent.

EXAMPLE J

A quaternizing agent for use in preparing a pigment grinding vehicle was prepared from the following mixture of ingredients:

| Ingredients | Parts by Weight | Solids |
|---|---|---|
| 2-ethylhexanol half-capped toluene diisocyanate in methyl isobutyl ketone | 320.0 | 304 |
| Dimethylethanolamine | 87.2 | 87.2 |
| 88% aqueous lactic acid solution | 117.6 | 88.2 |
| 2-butoxyethanol | 39.2 | — |

The 2-ethylhexanol half-capped toluene diisocyanate was added to the dimethylethanolamine in a suitable reaction vessel at room temperature. The mixture exothermed and was stirred for 1 hour at 80° C. Lactic acid was then charged followed by the addition of 2-butoxyethanol. The reaction mixture was stirred for about 1 hour at 65° C. to form the desired quaternizing agent.

EXAMPLE K

A pigment grinding vehicle was prepared from the following mixture of ingredients:

| Ingredients | Parts by Weight | Solids |
|---|---|---|
| EPON 829 | 710 | 682 |
| Bisphenol A | 289.6 | 289.6 |
| 2-ethylhexanol monourethane of 2,4-toluene diisocyanate in methyl isobutyl ketone | 406 | 386.1 |
| Quaternizing agent of Example j | 496.3 | 421.9 |
| Deionized water | 71.2 | — |
| 2-butoxyethanol | 1205.6 | — |

The EPON 829 and bisphenol A were charged under a nitrogen atmosphere to a suitable reaction vessel and heated to 150° to 160° C. to initiate an exotherm. The reaction mixture was permitted to exotherm for hour at 150° to 160° C. The reaction mixture was then cooled to 120° C. and the 2-ethylhexanol half-capped toluene diisocyanate added. The temperature of the reaction mixture was held at 110° to 120° C. for 1 hour followed by the addition of the 2-butoxyethanol. The reaction mixture was then cooled to 85° to 90° C., homogenized and then charged with water followed by the addition of the quaternizing agent. The temperature of the reaction mixture was held at 80° to 85° C. until an acid value of about 1 was obtained.

EXAMPLE L

Dibutyltin oxide catalyst was dispersed in the grinding vehicle prepared as described above in Example k in the following charge ratio:

| Ingredients | Parts by Weight |
|---|---|
| Pigment grinding vehicle as described in Example k | 145 |
| Deionized water | 321.6 |
| Dibutyltin oxide | 200 |

The ingredients were mixed together and ground in a steel ball mill to a Hegman No. 7 grind.

EXAMPLE M

A pigment grinding vehicle was prepared by reacting dimethylaminopropylamine with a fatty acid, followed by quaternization with a monoepoxide.

The dimethylaminopropylamine was reacted with the fatty acid as follows:

| Ingredients | Parts by Weight (grams) |
|---|---|
| EMPOL 1010[1] | 285.7 |
| Dimethylaminopropylamine | 127.73 |

[1] A dimerized fatty acid, available from Emery Industries.

To a properly equipped reaction vessel was charged the EMPOL 1010 and the dimethylaminopropylamine with a resulting exotherm to 75° C. The resultant reaction mixture was heated to reflux through a Vigreaux column for about 2 hours over a temperature range of 135° to 140° C. Thereafter, the reaction mixture was cooled to 132° C. and a Dean-Stark trap inserted on top of the Vigreaux column. Following this, water and unreacted dimethylaminopropylamine were removed from the reaction mixture by distillation over a period of 8 hours. The resultant reaction product was vacuum stripped to remove residual amine.

The amine-fatty acid reaction product prepared as described above was reacted with the monoepoxide butyl glycidyl ether as follows:

| Ingredients | Parts by Weight (grams) |
|---|---|
| Amine-fatty acid reaction product | 301.5 |
| 2-Butoxyethanol | 208.5 |
| 88% Aqueous lactic acid | 90 |
| Deionized water | 71.3 |
| Butyl glycidyl ether | 128.1 |

The amine-fatty acid reaction product and the 2-butoxyethanol were charged to a properly equipped reaction vessel and heated to 50° C., followed by adding the lactic acid. There was a resulting exotherm, with the reaction temperature being maintained over the range of 55°–65° C. for about 15 minutes. Thereafter, the deionized water was added, and the reaction mixture was allowed to react for about 15 minutes over the temperature range of 55°–65° C. This was followed by adding the butyl glycidyl ether, heating the reaction mixture to 75° C. and allowing it to react for 2 hours over the temperature range of 75°–85° C. The resultant reaction product had a solids content of 60.7 percent.

EXAMPLE N

Dibutyl oxide catalyst was dispersed in the grinding vehicle prepared as described in Example m in the following charge ratio:

| Ingredients | Parts by Weight |
|---|---|
| Pigment grinding vehicle as described in Example m | 30.32 |
| Deionized water | 255.9 |
| Dibutyltin oxide | 380.38 |

The ingredients were mixed together and ground in a steel ball mill to a Hegman No. 7 grind.

EXAMPLE O

Titanium dioxide, carbon black, basic lead silicate and dibutyltin oxide were dispersed in the pigment grinding vehicle of Example k in the following charge ratio:

| Ingredients | Parts by Weight |
|---|---|
| Pigment grinding vehicle as described in Example k | 226.36 |
| Deionized water | 359.58 |
| Titanium dioxide | 564.31 |
| Carbon black | 16.54 |
| Lead silicate | 33.08 |
| Catalyst paste of Example 1 | 95.33 |

The above ingredients were mixed together in the order indicated and ground in a steel ball mill to a Hegman No. 7 grind.

EXAMPLE P

A polyoxyalkylenepolyamine-polyepoxide adduct similar to that of Example h was prepared with the exception that the adduct was neutralized with acetic acid instead of lactic acid and the adduct was combined with a polyurethane crosslinker. The EPON 829-bisphenol A intermediate was prepared as follows:

| Ingredients | Parts by Weight |
|---|---|
| EPON 829 | 136.1 |
| Bisphenol A | 39.6 |
| 2-butoxyethanol | 52.3 |

The EPON 829 and bisphenol A were charged to a reaction vessel under a nitrogen blanket and heated to 70° C. to initiate an exotherm. The reaction mixture was allowed to exotherm and held at 180° C. for ½ hour. The reaction mixture was cooled to 160° C. and the 2-butoxyethanol added to give a solids content of 75 percent and an epoxy equivalent of 438 (based on solids).

A polyoxypropylenediamine having a molecular weight of 2000 and commercially available from Jefferson Chemical Company as JEFFAMINE D-2000 was reacted with the polyepoxide intermediate described above as follows:

| Ingredients | Parts by Weight |
|---|---|
| JEFFAMINE D-2000 | 132.7 |
| Polyepoxide intermediate | 67.4 |

-continued

| Ingredients | Parts by Weight |
|---|---|
| 2-butoxyethanol | 2.4 |
| Polyurethane crosslinker[1] | 174.5 |
| Acetic acid | 3.9 |
| Surfactant of Example B | 7.4 |
| Deionized water | 416.8 |

[1]Polyurethane crosslinker formed from half-capping toluene diisocyanate (80/20 2,4-/2,6-isomer mixture) with 2-butoxyethanol and reacting this product with trimethylolpropane in a 3:1 molar ratio. The crosslinker is present as a 70 percent solids solution in methyl isobutyl ketone and butanol (9:1 weight ratio).

The JEFFAMINE D-2000 was charged to a reaction vessel under a nitrogen atmosphere and heated to 90° C. The polyepoxide intermediate was added over the period of about ½ hour. At the completion of the addition, the reaction mixture was heated to 130° C., held for 3 hours, followed by the addition of the 2-butoxyethanol and polyurethane crosslinker. The reaction mixture was then solubilized by blending with acetic acid, the surfactant and deionized water. The adduct had a solids content of 38.1 percent.

The following examples show the formulation of coating compositions for the process of cationic electrodeposition in accordance with the present invention (Examples 10-15) using the cationic resins of Examples II through V and VIII through IX. For the purpose of comparison, a coating composition (Example 15a) using the cationic resin of Example IXa was also prepared and electrodeposited.

EXAMPLE 10

A cationic electrodeposition coating composition was prepared by mixing together the following ingredients:

| Ingredients | Parts by Weight (in grams) | Solids (in grams) |
|---|---|---|
| Additive of Example h | 238.1 | 90.0 |
| Plasticizer[1] | 37.5 | 37.5 |
| Deionized water | 200 | — |
| Resin of Example III | 1722.7 | 621.9 |
| Deionized water | 1584 | — |
| Catalyst paste of Example n | 19.72 | 11.25 |
| Deionized water | 100 | — |

[1]Plasticizer available from Rohm and Haas Company as PARAPLEX WP-1.

The composition was pH adjusted (6.63 to 6.05) by adding 45 grams of 10 percent aqueous lactic acid solution. The solution was ultrafiltered and further modified by adding 4.67 grams to a 20.9 percent aqueous lead lactate solution to give a cationic electrodeposition coating composition containing 250 ppm lead on total coating composition weight.

Zinc phosphate pretreated steel panels were cathodically electrodeposited in the coating composition at a temperature of 83° F. (28° C.) at 275 volts for 2 minutes to give a continuous film. The coating was cured by heating at 171° C. for 30 minutes to give a cured coating having a thickness of about 1 mil with good appearance. The smoothness of the cured film was measured with a Surtronic-3 from Rank Taylor Hobson Ltd. and found to be 12 to 13 microinches, whereas the substrate had a surface roughness of 32 microinches. The cured coating was solvent resistant in that it withstood 100 acetone double rubs. An acetone double rub is a rub back and forth (double rub) with an acetone-saturated cloth using normal hand pressure. Rubbing is continued until the coating softens or dissolves through to the substrate with 100 double rubs being the limit of the test. The coated panels were also exposed to salt spray corrosion environment in which they were first scribed with an "X" and exposed to a salt spray fog as described in ASTM D-117. After 14 days, the panels were removed from the testing chamber and the scribe mark lightly scraped with a scalpel and the creepage (undercut loss of adhesion) from the scribe line measured. The scribe creepage was 1/32 inch from the scribe line. After 30 days salt spray exposure as described above, the scribe creepage was still only 1/32 inch from the scribe line.

EXAMPLE 11

A cationic electrodeposition coating composition similar to Example 10 was prepared from the following mixture of ingredients:

| Ingredients | Parts by Weight (in grams) | Solids (in grams) |
|---|---|---|
| Additive of Example h | 238.1 | 90.0 |
| Plasticizer as used in Example 10 | 37.5 | 37.5 |
| Deionized water | 200 | — |
| Resin of Example II | 1766.8 | 621.9 |
| Deionized water | 1539.9 | — |
| Catalyst paste of Example n | 19.72 | 11.25 |
| Deionized water | 100 | — |

The composition was adjusted in pH by adding 95 grams of a 10 Percent aqueous lactic acid solution. The solution was ultrafiltered and further modified by adding 4.67 grams of a 20.9 percent aqueous lead lactate solution added to give a cationic electropositable composition containing 250 ppm lead based on total coating composition weight.

Zinc phosphate pretreated steel panels were electrodeposited in the coating composition at a temperature of 83° F. (28° C.) at 230 volts for 2 minutes to give a continuous film. The resultant electrodeposited coating was cured by heating at 171° C. for 30 minutes to form a film having a thickness of about 1.1-1.25 mils with good appearance. The smoothness measured as described in Example 10 was 16 to 17 microinches, whereas the uncoated steel panel had a smoothness of 36 microinches. The cured coating also had excellent solvent resistance and corrosion resistance being able to withstand 100 acetone double rubs. After 14 days salt spray exposure described in Example 10 above, there was only 1/64 inch creepage from the scribe line. After 30 days salt spray exposure, there was only 1/32 inch creepage from the scribe line.

EXAMPLE 12

A cationic electrodeposition coating composition similar to Example 10 was prepared from the following mixture of ingredients:

| Ingredients | Parts by Weight (in grams) | Solids (in grams) |
|---|---|---|
| Additive of Example h | 238.1 | 90.0 |
| Plasticizer as used in Example 10 | 37.5 | 37.5 |
| Deionized water | 200 | — |
| Resin of Example IV | 1680.8 | 621.9 |
| Deionized water | 1625.9 | — |
| Catalyst paste of Example n | 19.72 | 11.25 |
| Deionized water | 100 | — |

The composition was pH adjusted by adding 48 grams of a 10 Percent aqueous lactic acid solution. The solution was then ultrafiltered and 4.67 grams of a 20.9 percent aqueous lead lactate solution was added to give a cationic electrodepositable composition containing 250 ppm soluble lead based on total coating composition weight.

Zinc phosphate pretreated steel panels were cathodically electrodeposited in the coating composition at a temperature of 83° F. (28° C.) at 80 volts for 2 minutes to give a continuous film. The film was cured by heating at 171° C. for 30 minutes to give a cured coating with good appearance although slightly cratered having a thickness of about 1.25 mils. The cured coating had a surface smoothness determined in accordance with the method of Example 10 of 37 to 38 microinches. The uncoated steel substrate had a surface smoothness of 42 microinches. The cured coating had excellent solvent resistance and corrosion resistance being resistant to 100 acetone double rubs. After 14 days salt spray exposure as described in Example 10, there was only 1/32 inch creepage from the scribe line. After 30 days salt spray exposure, the creepage was 1/16 inch from the scribe line.

EXAMPLE 13

A cationic electrodepositable coating composition was prepared from the following mixture of ingredients:

| Ingredients | Parts by Weight (in grams) | Solids (in grams) |
|---|---|---|
| Additive of Example h | 238.1 | 90.0 |
| Plasticizer as used in Example 10 | 37.5 | 37.5 |
| Deionized water | 200 | — |
| Resin of Example V | 1794.4 | 621.9 |
| Deionized water | 1509.3 | — |
| Catalyst paste of Example n | 19.72 | 11.25 |
| Deionized water | 100 | — |

The composition was pH adjusted by adding 45 grams of 10 percent aqueous lactic acid solution. The solution was ultrafiltered and further modified by adding 4.67 grams of a 20.9 percent aqueous lead lactate solution to give a cationic electrodepositable coating composition containing 250 ppm soluble lead based on total coating composition weight.

Zinc phosphate pretreated steel panels were cathodically electrodeposited in the coating composition at a temperature of 83° F. (28° C.) at 130 volts for 2 minutes to give a continuous film. The coating was cured by heating at 171° C. for 30 minutes to give a cured coating with good appearance. The smoothness of the cured coating was 12 to 13 microinches, whereas the smoothness of the uncoated steel panel was 33 microinches. The cured coating had excellent solvent resistance and corrosion resistance being resistant to 100 acetone double rubs. After exposure to the salt spray fog as described in Example 10 for 14 days, the creepage was 1/32 inch from the scribe line. After 30 days salt spray exposure, the creepage from the scribe line was still only 1/32 inch.

The following Examples 14, 15 and 15a compare the smoothness of cationic electrodeposited coatings prepared with the advanced cationic epoxy resins of the invention, i.e., Examples VIII and IX, and advanced cationic epoxy resins chain extended with only polycaprolactone diol, i.e., Example IXa.

EXAMPLE 14

A cationic electrodepositable paint was prepared from the following mixture of ingredients:

| Ingredients | Parts by Weight (in grams) | Resin Solids (in grams) | Pigment Solids (in grams) |
|---|---|---|---|
| Additive of Example p | 202.6 | 77.18 | — |
| Cationic resin of Example VIII | 1460.6 | 522.9 | — |
| Deionized water | 1730.3 | — | — |
| Pigment paste of Example o | 407.0 | 43.15 | 192.93 |
| 10% aqueous lactic acid | 40 | — | — |

Zinc phosphate pretreated steel panels were cathodically electrodeposited in the paint at 100° F. (38° C.) at 275 volts for 4 minutes to give a continuous film. When the film was cured by heating at 171° C. for 30 minutes, a cured coating having good appearance and a film thickness of about 1.2 mil was obtained. The coating was very smooth having a surface smoothness as determined in accordance with the procedure of Example 10 of 13 microinches, whereas the smoothness of the uncoated steel panel was 23 microinches.

EXAMPLE 15

A cationic electrodepositable paint was prepared from the following mixture of ingredients:

| Ingredients | Parts by Weight (in grams) | Resin Solids (in grams) | Pigment Solids (in grams) |
|---|---|---|---|
| Additive of Example p | 202.6 | 77.18 | — |
| Cationic resin of Example IX | 1556.3 | 522.9 | — |
| Deionized water | 1634.6 | — | — |
| Pigment paste of Example o | 407.0 | 43.15 | 192.93 |
| 10% aqueous lactic acid | 15.0 | — | — |

The cationic paint was first ultrafiltered and then zinc phosphate pretreated steel panels as used in Example 14 were cathodically electrodeposited in the paint at 100° F. (38° C.) at 250 volts for 2 minutes to give a continuous film (1.2 mil). When the coating was cured by heating at 171° C. for 30 minutes, a cured coating having good appearance and a thickness of about 1.2 mil was obtained. The cured film was exceedingly smooth having a surface smoothness as determined in accordance with the procedure of Example 10 of about 8 microinches, whereas the smoothness of the uncoated steel panel was 22 microinches.

COMPARATIVE EXAMPLE 15a

A cationic electrodepositable paint was prepared from the following mixture of ingredients:

| Ingredients | Parts by Weight (in grams) | Resin Solids (in grams) | Pigment Solids (in grams) |
|---|---|---|---|
| Additive of Example p | 202.6 | 77.18 | — |
| Cationic resin of Comparative Example IXa | 1460.6 | 522.9 | — |
| Deionized water | 1730.3 | — | — |
| Pigment paste of Example o | 407.0 | 43.15 | 192.93 |

| Ingredients | Parts by Weight (in grams) | Resin Solids (in grams) | Pigment Solids (in grams) |
|---|---|---|---|
| 10% aqueous lactic acid | 15.0 | — | — |

The cationic paint was first ultrafiltered and then zinc phosphate pretreated steel panels as used in Example 14 were cathodically electrodeposited in the paint at 100° F. (38° C.) at 275 volts for 2 minutes to give a continuous film. When the coating was cured by heating at 171° C. for 30 minutes, a cured coating having good appearance and a thickness of about 1.2 mil was obtained. The film had a surface smoothness as determined in accordance with the procedure of Example 10 of 26 microinches, whereas the smoothness of the uncoated steel panel was 26 microinches.

Examples 14, 15 and Comparative Example 15a show that coatings cathodically electrodeposited from compositions containing resins chain extended with the poly(hydroxyethyl)-substituted urethanes in accordance with the present invention are smoother than coatings electrodeposited from compositions containing the polycaprolactone diol chain-extended resin. Example 15 is interesting in that it shows chain extending with a mixed polycaprolactone-poly(hydroxyethyl)-substituted urethane (90/10 weight ratio) results in the smoothest film.

We claim:

1. An ungelled reaction product of a polyepoxide and an active hydrogen-containing material at least two active hydrogens per molecule, characterized in that the active hydrogen-containing material serves as a chain extender for the polyepoxide and is selected from the class consisting of a hydroxyalkyl-substituted urethane in which an hydroxy group is in the beta position to the urethane group and an ethoxylated derivative of said hydroxyalkyl-substituted urethane including mixtures thereof wherein epoxy groups in the polyepoxide react with the active hydrogens in the hydrogen-containing material.

2. The reaction product of claim 1 in which the hydroxyalkyl-substituted urethane is a poly(hydroxyalkyl)-substituted urethane in which the hydroxy groups are in the beta position to the urethane group.

3. The reaction product of claim 1 in which the polyepoxide is a polyglycidyl ether of a polyphenol.

4. The reaction product of claim 1 in which the hydroxyalkyl-substituted urethane is of the structure:

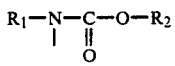

wherein $R_1$ and $R_2$ are the same or different and are selected from the class consisting of hydroxyethyl or hydroxypropyl.

5. The reaction product of claim 1 in which the hydroxyalkyl-substituted urethane is of the structure:

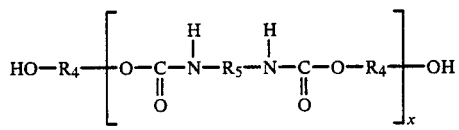

wherein $R_4$ is selected from the class consisting of ethylene, isopropylene and oxydiethylene; $R_5$ is a radical selected from the class consisting of aliphatic, oxaliphatic, cycloaliphatic and aromatic radicals and $x = 1$ to 3.

6. The reaction product of claim 1 further reacted to contain cationic groups.

7. The reaction product of claim 6 in which the cationic groups are amine salt groups.

8. The reaction product of claim 6 which contains from 0.1 to 3 milliequivalents of cationic base group per gram of resin solids.

9. The reaction product of claim 6 in combination with a capped isocyanate curing agent.

10. A method of coating a conductive substrate serving as a cathode in an electrical circuit comprising said cathode and an anode immersed in an aqueous composition, said aqueous composition comprising the reaction product of an ungelled reaction product of a polyepoxide and an active hydrogen-containing material having at least two active hydrogens per molecule, characterized in that the active hydrogen-containing material serves as a chain extender for the polyepoxide and is selected from the class consisting of a hydroxyalkyl-substituted urethane in which an hydroxy group is in the beta position to the urethane group and an ethoxylated derivative of said hydroxyalkyl-substituted urethane including mixtures thereof wherein epoxy groups in the polyepoxide react with the active hydrogens in the hydrogen-containing material, which reaction product is further reacted to contain cationic groups, and in which circuit electric current is passed between the anode and the cathode to cause a coating derived from the resin to deposit on the cathode.

11. The method of claim 10 in which the hydroxyalkyl-substituted urethane is a poly(hydroxyalkyl)-substituted urethane in which the hydroxy groups are in the beta position to the urethane group.

12. The method of claim 10 in which the polyepoxide is a polyglycidyl ether of a polyphenol.

13. The method of claim 10 in which the hydroxyalkyl-substituted urethane is of the structure:

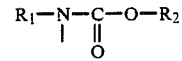

wherein $R_1$ and $R_2$ are the same or different and are selected from the class consisting of hydroxyethyl or hydroxypropyl.

14. The method of claim 10 in which the hydroxyalkyl-substituted urethane is of the structure:

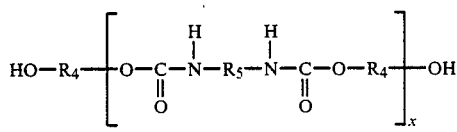

wherein $R_4$ is selected from the class consisting of ethylene, isopropylene and oxydiethylene; $R_5$ is a radical selected from the class consisting of aliphatic, oxaliphatic, cycloaliphatic and aromatic radicals and $x = 1$ to 3.

15. The method of claim 10 in which the cationic groups are amine salt groups.

16. The method of claim 15 in which the reaction product is in combination with a capped isocyanate curing agent.

17. The method of claim 10 which contains from 0.1 to 3 milliequivalents of cationic base group per gram of resin solids.

18. The method of claim 10 in which the reaction product is in combination with a capped isocyanate curing agent.

* * * * *

UNITED STATES PATENT AND TRADEMARK OFFICE
CERTIFICATE OF CORRECTION

PATENT NO. : 4,931,157

DATED : June 5, 1990

INVENTOR(S) : Joseph T. Valko, Joseph E. Plasynski, Robert D. Miller

It is certified that error appears in the above-identified patent and that said Letters Patent is hereby corrected as shown below:

Col. 29, line 32, (Claim 1) insert --having-- after "material".

Signed and Sealed this

Eleventh Day of June, 1991

Attest:

HARRY F. MANBECK, JR.

*Attesting Officer*  *Commissioner of Patents and Trademarks*